(12) United States Patent
Kim

(10) Patent No.: US 7,455,071 B2
(45) Date of Patent: Nov. 25, 2008

(54) HYDRAULIC CONTROL VALVE FOR DRIP HOSES

(76) Inventor: Choon Il Kim, 556-36 Sinwol-Dong, Yangchun-Gu, Seoul 158-090 (KR)

( * ) Notice: Subject to any disclaimer, the term of this patent is extended or adjusted under 35 U.S.C. 154(b) by 549 days.

(21) Appl. No.: 10/559,622

(22) PCT Filed: Jun. 15, 2004

(86) PCT No.: PCT/KR2004/001427

§ 371 (c)(1),
(2), (4) Date: Dec. 6, 2005

(87) PCT Pub. No.: WO2004/110133

PCT Pub. Date: Dec. 23, 2004

(65) Prior Publication Data

US 2007/0095950 A1    May 3, 2007

(30) Foreign Application Priority Data

Jun. 16, 2003    (KR) .................. 20-2003-0018943

(51) Int. Cl.
*F16K 15/14*    (2006.01)

(52) U.S. Cl. .................. 137/517; 137/843; 137/853

(58) Field of Classification Search .................. 137/494, 137/497, 517, 843, 853
See application file for complete search history.

(56) References Cited

U.S. PATENT DOCUMENTS

| 699,273 | A | * | 5/1902 | Wolski | 137/853 |
|---|---|---|---|---|---|
| 2,223,944 | A | * | 12/1940 | Roy | 137/517 |
| 3,985,336 | A | | 10/1976 | Bentley | |
| 3,998,244 | A | | 12/1976 | Bentley | |
| 4,022,244 | A | * | 5/1977 | Oman | 137/517 |
| 5,137,216 | A | | 8/1992 | Hanish | |
| 5,323,806 | A | * | 6/1994 | Watari et al. | 137/517 |
| 6,085,986 | A | | 7/2000 | Yu | |

FOREIGN PATENT DOCUMENTS

KR    200306609    2/2003

* cited by examiner

*Primary Examiner*—John Rivell
(74) *Attorney, Agent, or Firm*—IPLA P.A.; James E. Bame

(57) ABSTRACT

The object of this invention is to provide a hydraulic control valve for drip hoses, which controls a flow of water according to a water pressure, thus keeping a pressure of Water fed to a drip hose constant. The hydraulic control valve includes a hose connector (110) clamped at opposite ends thereof to a branch hose (H/S) and a drip hose (H/N), a water supply path having a larger-diameter path (120a) and a smaller-diameter path (120b), a U-shaped flexible cup (200), and a support ring (300). The Larger-diameter path includes a stepped seat (142) having projections (141) and depressions (142). The smaller-diameter path includes an inward projecting step (150). The cup is placed at an end thereof to be near to the inward projecting step, and includes a flange (210). The support ring (300) is fitted into the larger-diameter path to prevent a removal of the cup.

2 Claims, 9 Drawing Sheets

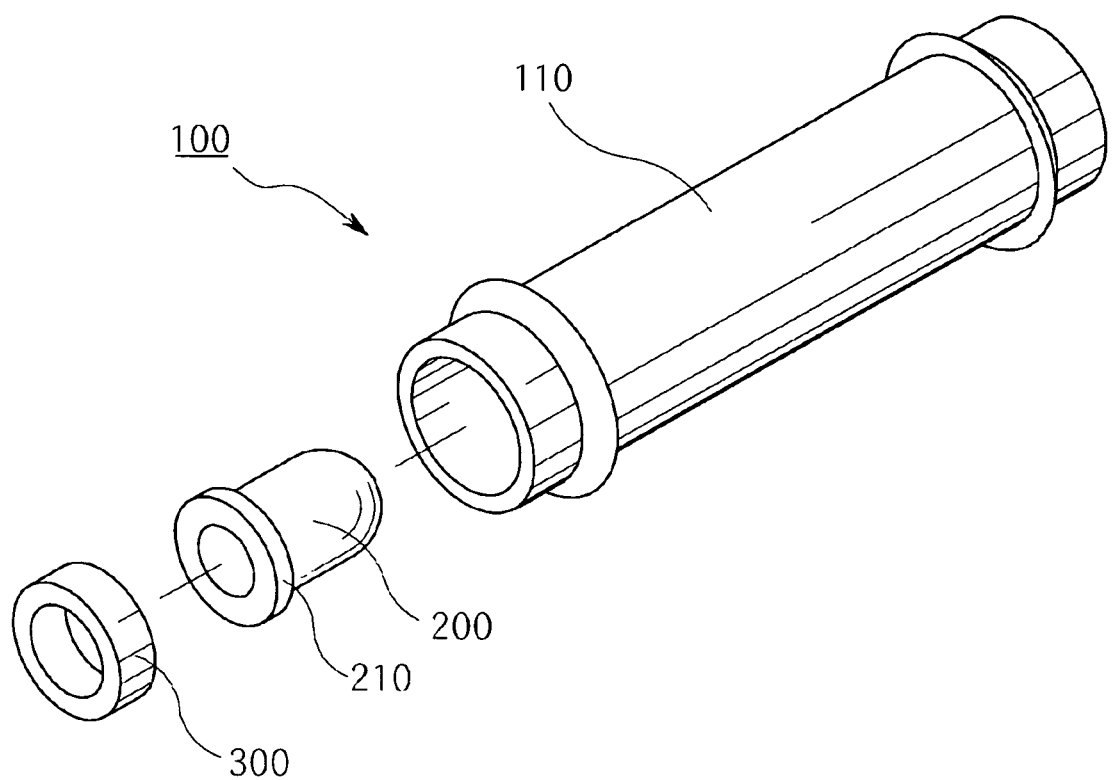
[Fig. 1]

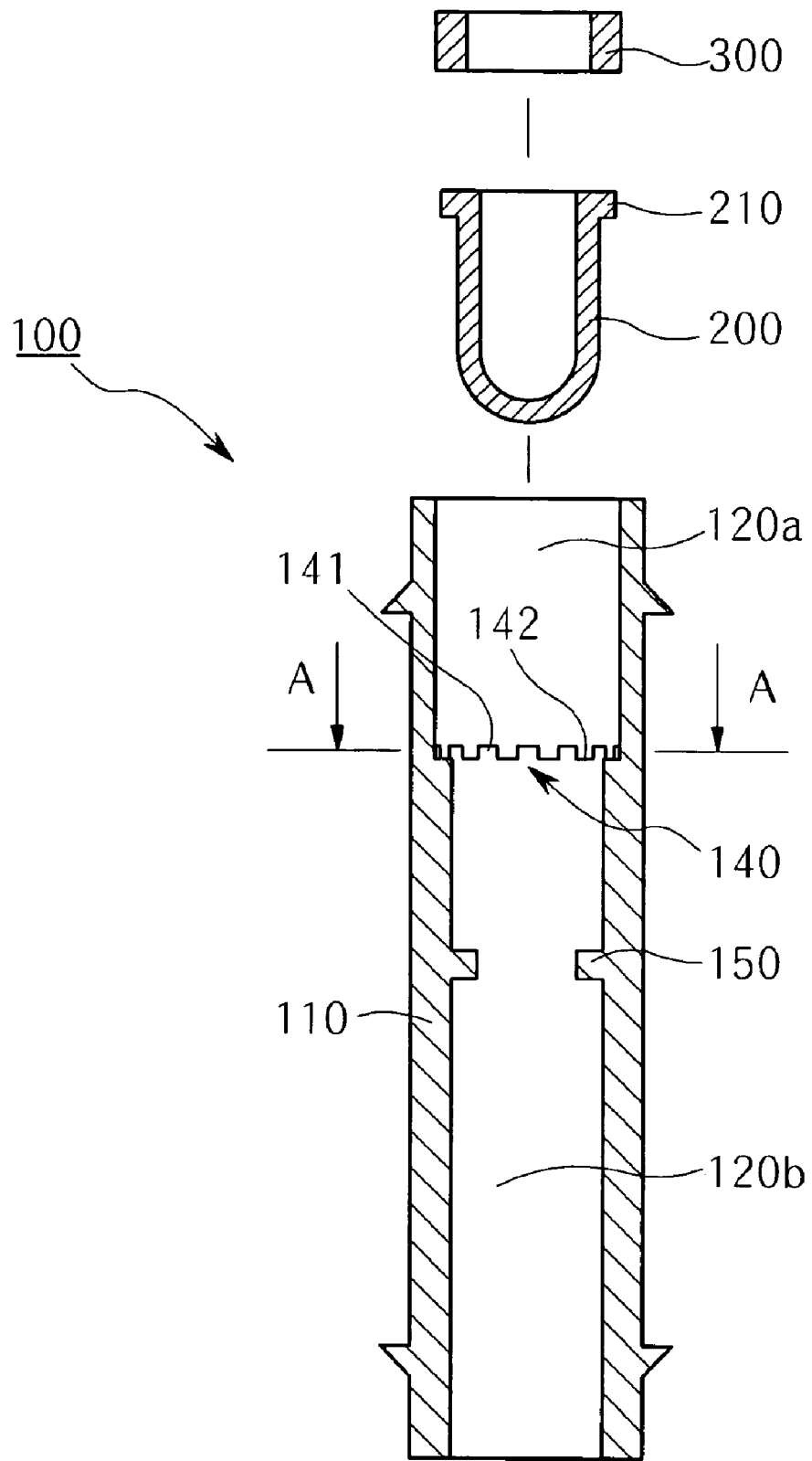
[Fig. 2]

[Fig. 3]
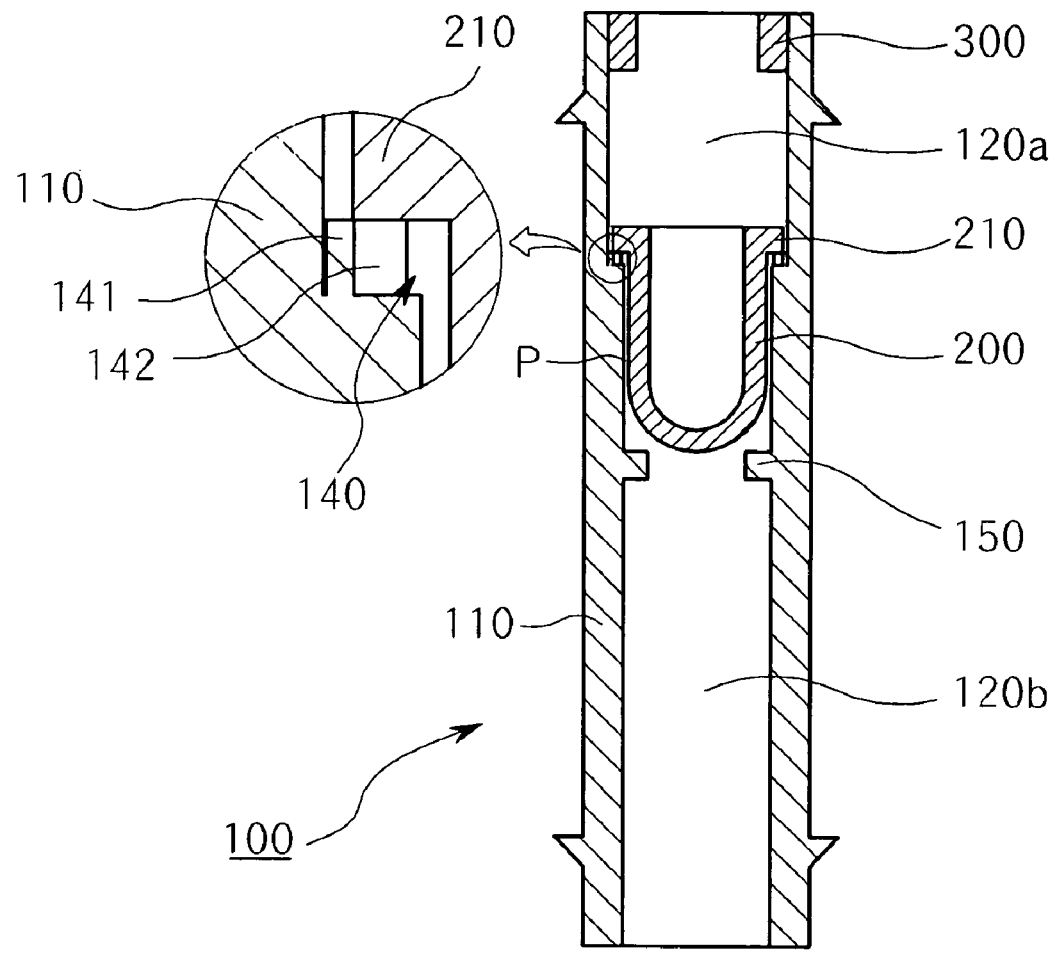
[Fig. 4]
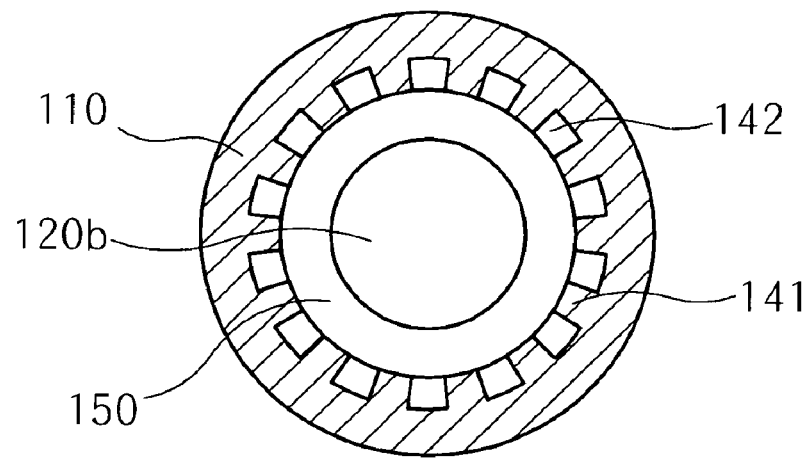

[Fig. 5]
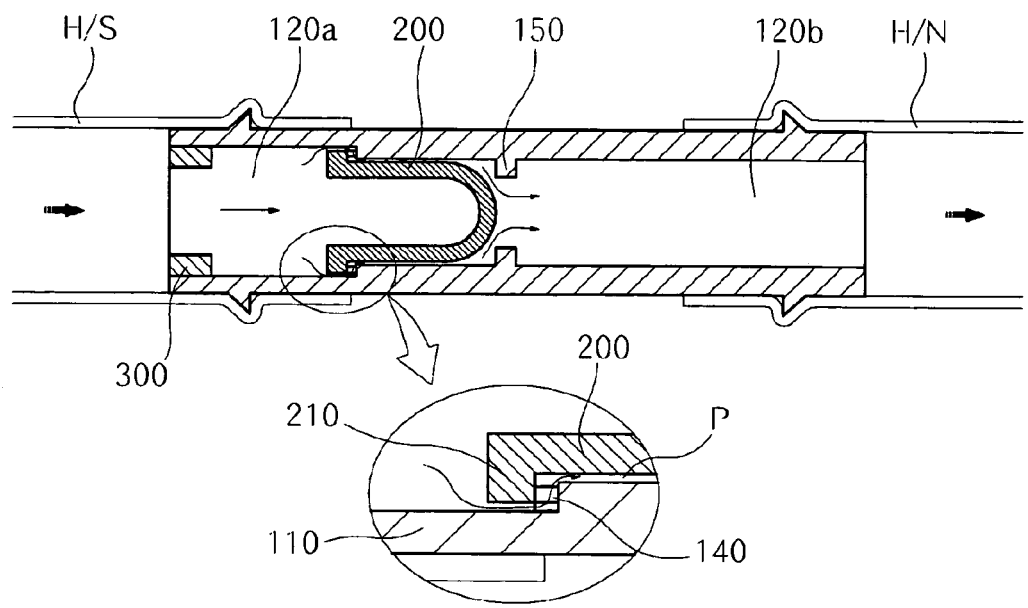
[Fig. 6]
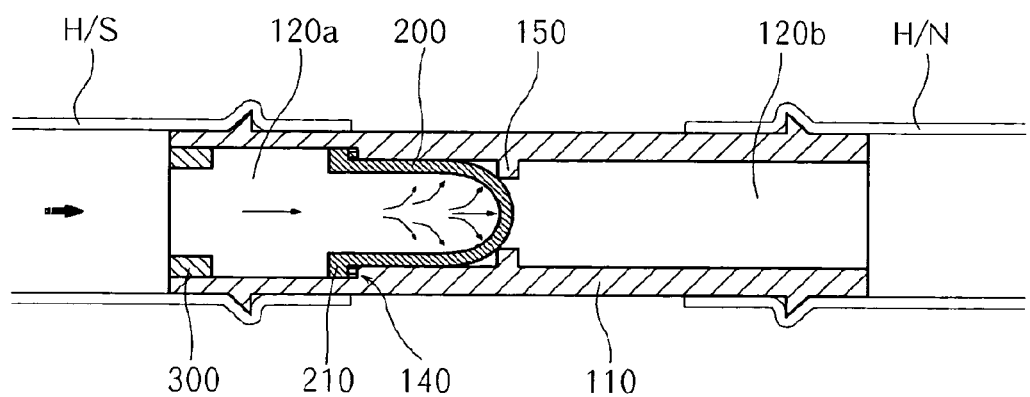

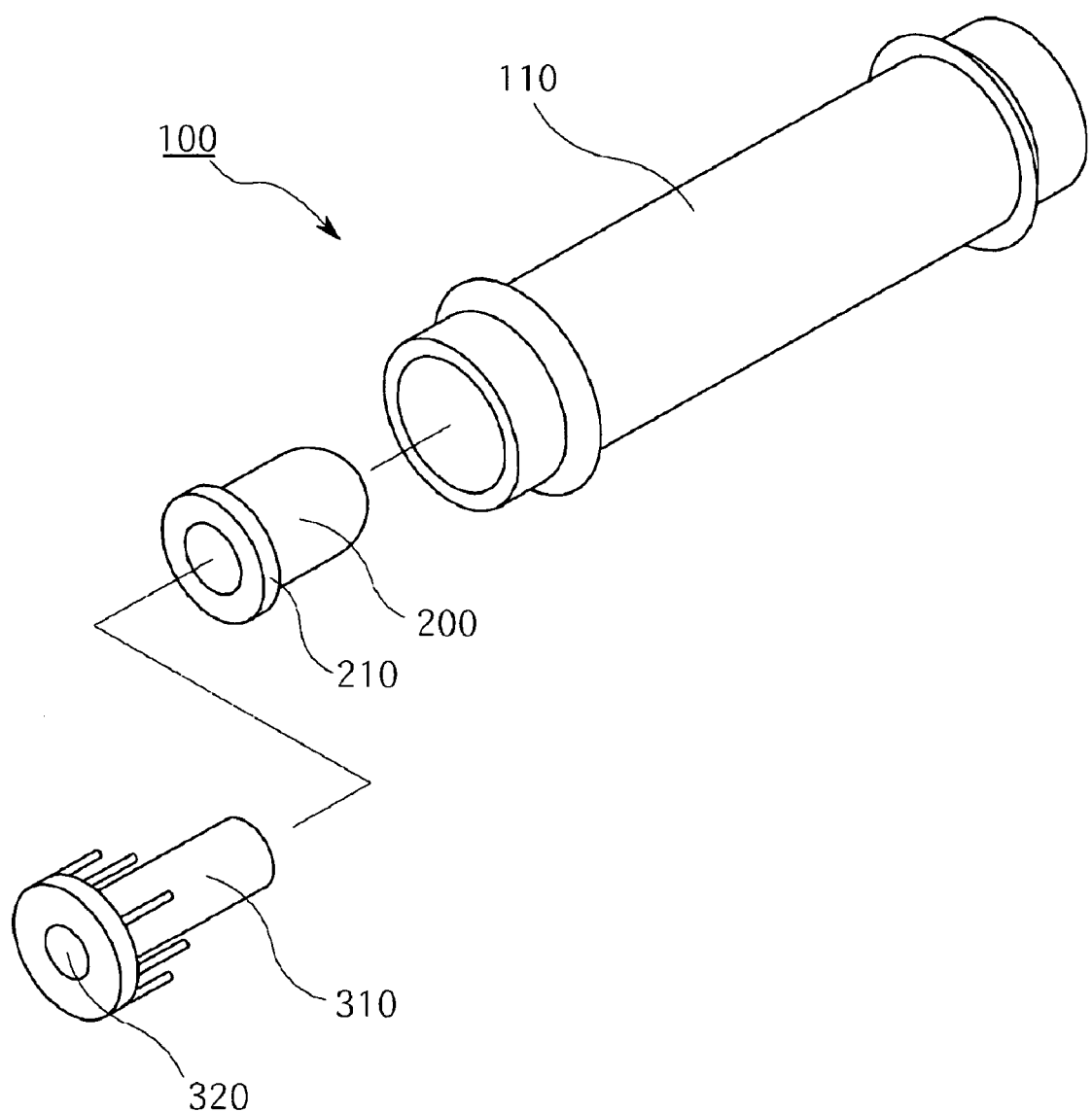
[Fig. 7]

[Fig. 8]
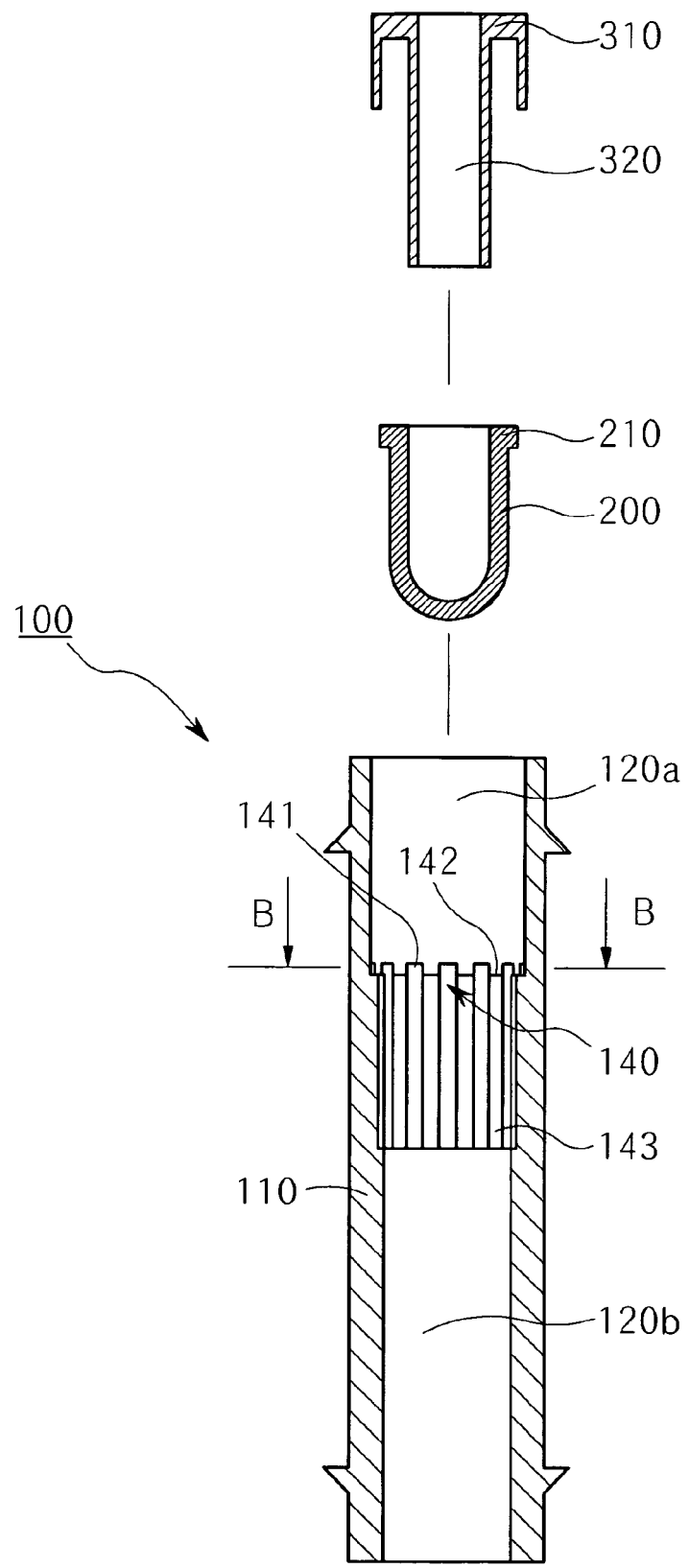

[Fig. 9]
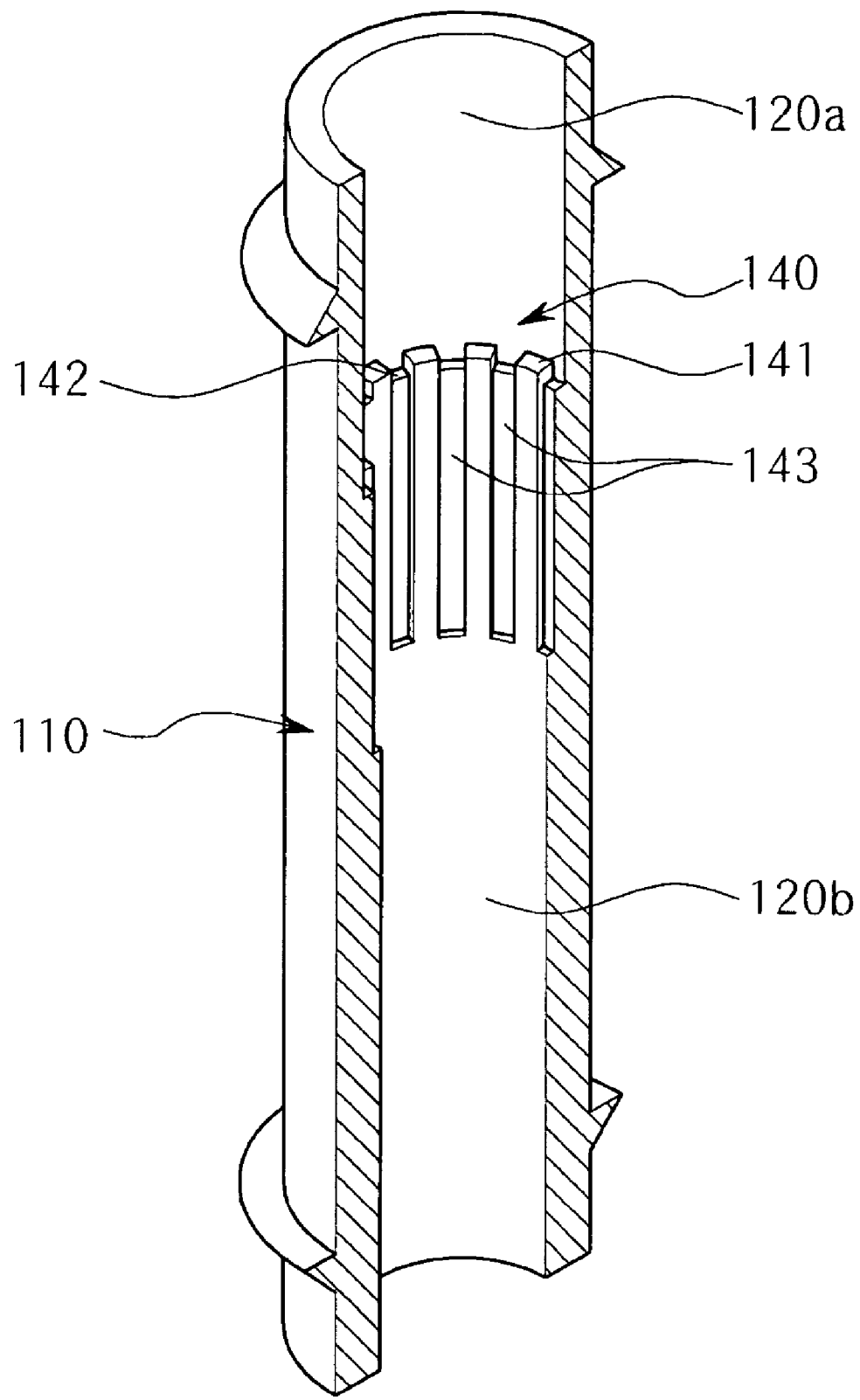

[Fig. 10]
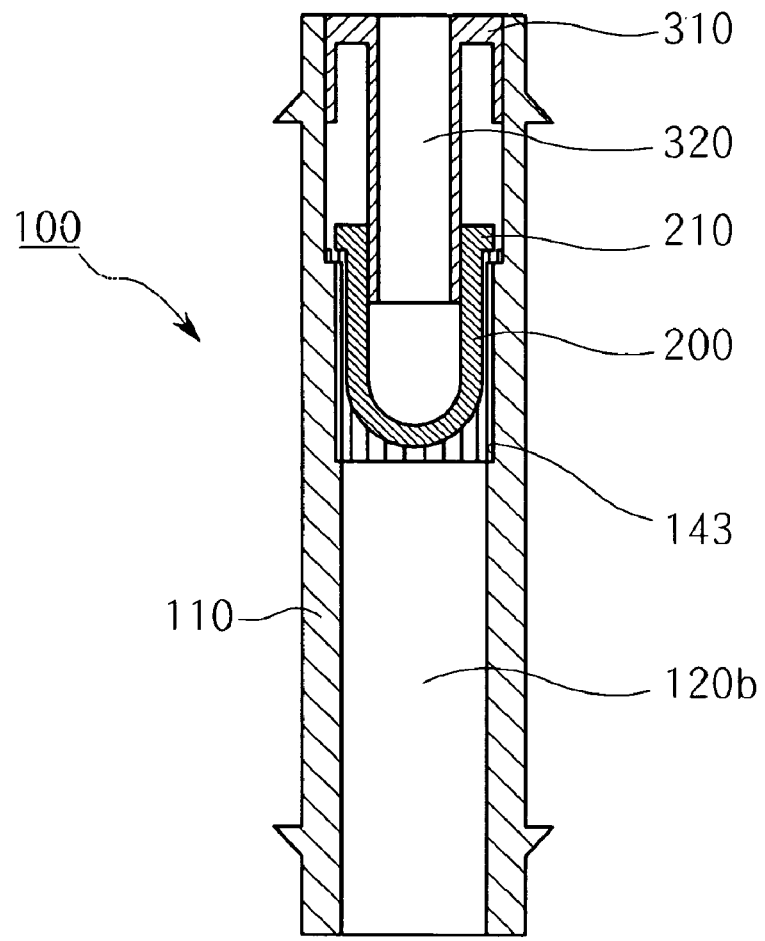
[Fig. 11]
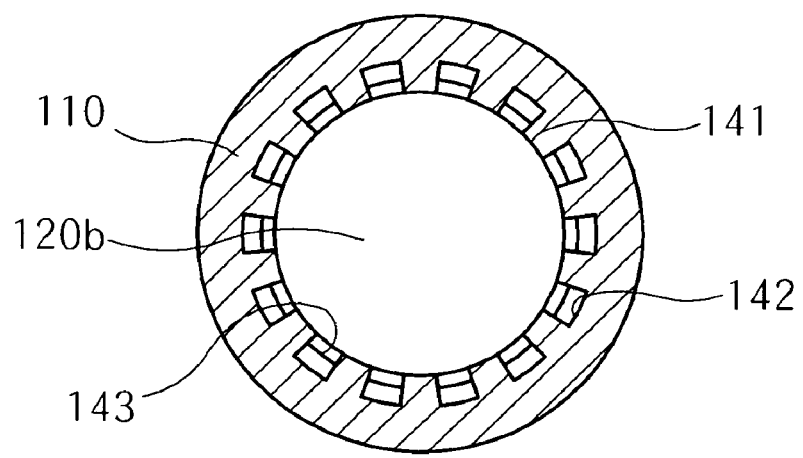

[Fig. 12]
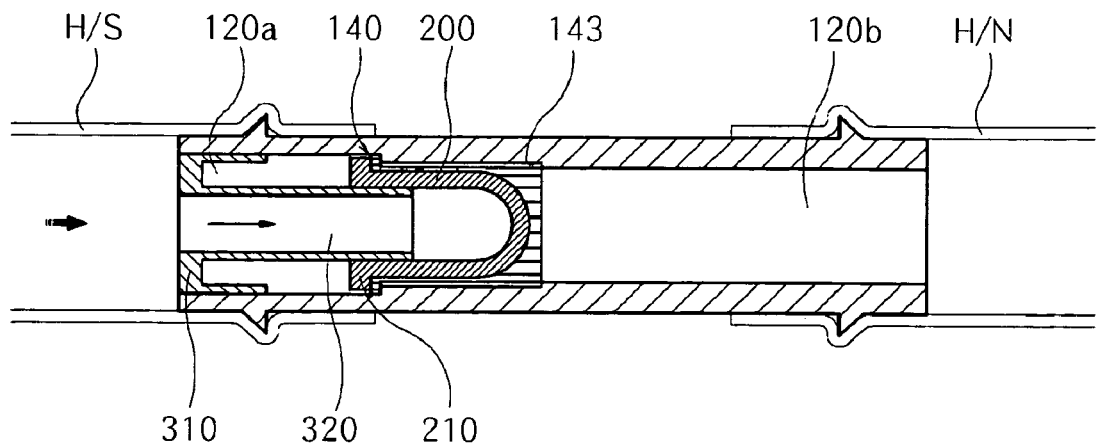
[Fig. 13]
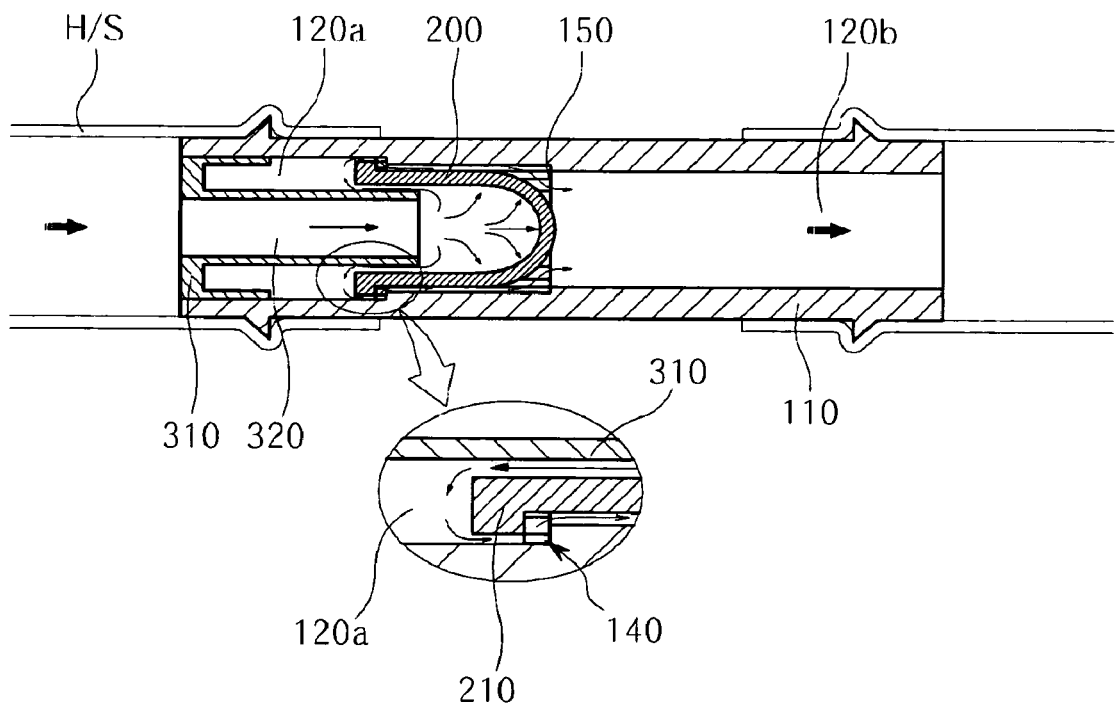

HYDRAULIC CONTROL VALVE FOR DRIP HOSES

TECHNICAL FIELD

The present invention relates, in general, to a valve capable of controlling a pressure of water which is fed to crops cultivated in greenhouses and, more particularly, to a hydraulic control valve for drip hoses, which is constructed to appropriately control a water pressure, prior to feeding high-pressure water of a water pump to a drip hose.

BACKGROUND ART

Generally, a cultivation method with drip irrigation system has been proposed as forcing culture, which promotes growth of crops cultivated in a greenhouse or large farmland by feeding proper amounts of water and nutrients to the crops.

This cultivation method with drip irrigation system is executed by drip hoses. The drip hoses are branched off of a high-pressure water pipe, namely, a main water supply pipe, to supply water in a drip fashion to a ridge and furrow where crops are cultivated.

However, the cultivation method with drip irrigation system has a problem in that water injection holes may be torn or water may be dispersed when high-pressure water is supplied to the drip hoses, thus causing a waste of water.

DISCLOSURE OF INVENTION

Accordingly, the present invention has been made keeping in mind the above problems occurring in the prior art, and an object of the present invention is to provide a hydraulic control valve for drip hoses, capable of appropriately controlling a water pressure, prior to feeding high-pressure water of a water pump to a drip hose, thus preventing the drip hose from being damaged.

Another object of the present invention is to provide a hydraulic control valve for drip hoses, which has a simple structure so that there is no probability of malfunction, thus maximizing operational reliability thereof.

In order to accomplish the above object, the present invention provides a hydraulic control valve for drip hoses, including a hose connector clamped at opposite ends thereof to an end of a branch hose and an end of a drip hose, respectively, and having a water supply path in the hose connector, wherein the water supply path includes a larger-diameter path having a stepped seat comprising an uneven seat, and a smaller-diameter path having at a predetermined position thereof an inward projecting step, and the hydraulic control valve further includes a U-shaped flexible cup which is opened at a first end thereof is placed at a second end thereof to be near to the inward projecting step, and includes a flange outwardly protruded from an edge of the U-shaped flexible cup and stopped by the uneven seat so that the U-shaped flexible cup is fitted into the smaller-diameter path while an outer surface of the U-shaped flexible cup is spaced apart from the smaller-diameter path by a predetermined gap, and the hydraulic control valve further includes a support ring fitted into an end of the larger-diameter path to prevent the U-shaped flexible cup from being removed.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view of a hydraulic control valve, according to an embodiment of the present invention;

FIG. 2 is an exploded sectional view to show an interior of the hydraulic control valve of FIG. 1;

FIG. 3 is a sectional view of the hydraulic control valve of FIG. 1, when the hydraulic control valve is assembled;

FIG. 4 is a sectional view taken along the line A-A of FIG. 2;

FIGS. 5 and 6 show operations of the hydraulic control valve of FIG. 1, in which FIG. 5 shows the operation of the hydraulic control valve when a water pressure is low, and FIG. 6 shows the operation of the hydraulic control valve when a water pressure is high;

FIG. 7 is an exploded perspective view of a hydraulic control valve, according to another embodiment of the present invention;

FIG. 8 is an exploded sectional view to show an interior of the hydraulic control valve of FIG. 7;

FIG. 9 is a partial sectional perspective view of a hose connector included in the hydraulic control valve of FIG. 7;

FIG. 10 is a sectional view of the hydraulic control valve of FIG. 7, when the hydraulic control valve is assembled;

FIG. 11 is a sectional view taken along the line B-B of FIG. 8; and

FIGS. 12 and 13 show operations of the hydraulic control valve of FIG. 7, in which FIG. 12 shows the operation of the hydraulic control valve when a water pressure is low, and FIG. 13 shows the operation of the hydraulic control valve when a water pressure is high.

BEST MODE FOR CARRYING OUT THE INVENTION

Reference should now be made to the drawings, in which the same reference numerals are used throughout the different drawings to designate the same or similar components.

As shown in FIGS. 1 through 4, a hydraulic control valve 100 according to the first embodiment of the present invention, includes a hose connector 110 clamped at opposite ends thereof to an end of a branch hose H/S and an end of a drip hose H/N, respectively. A water supply path is defined in the hose connector 110, and includes a larger-diameter path 120a having a stepped seat and a smaller-diameter path 120b.

In this case, the stepped seat is manufactured in a form of an uneven seat 140 having a plurality of projections 141 and depressions 142 that are alternately arranged on an upper surface of the uneven seat 140. The hydraulic control valve 100 further includes a U-shaped flexible cup 200 and a support ring 300. The U-shaped flexible cup 200 is opened at a first end thereof. A flange 210 is outwardly protruded from an edge of the U-shaped flexible cup 200, and is stopped by the uneven seat 140 so that the U-shaped flexible cup 200 is fitted into the smaller-diameter path 120b while an outer surface of the U-shaped flexible cup 200 is spaced apart from the smaller-diameter path 120b by a predetermined gap P. The support ring 300 is fitted into an end of the larger-diameter path 120a to prevent the U-shaped flexible cup 200 from being undesirably removed.

Further, an inward projecting step 150 is provided in the smaller-diameter path 120b to be inwardly projected from a wall of the smaller-diameter path 120b, and is placed near to a second end of the U-shaped flexible cup 200.

The operation of the hydraulic control valve constructed in this way is as follows. That is, as shown in FIG. 5, a pressure of water fed from the branch hose H/S connected to the hose connector 110 acts on an interior of the U-shaped flexible cup 200. However, when the water pressure is low, the U-shaped flexible cup 200 is not be outwardly expander water passes through the depressions 140 of the uneven seat 140 and the gap P between the smaller-diameter path 120b and the outer surface of the U-shaped flexible cup 200. Thus, water having appropriate pressure is fed to the drip hose H/N.

Meanwhile, as shown in FIG. 6, when the water pressure is high, the water pressure acts on the interior of the U-shaped flexible cup 200, while expanding the U-shaped flexible cup 200 outward.

As a result, the U-shaped flexible cup 200 is outwardly expanded. Simultaneously, the outer surface of the U-shaped flexible cup 200 comes into close contact with an inner circumference of the smaller-diameter path 120b, and the second end of the U-shaped flexible cup 200 comes into contact with the inward projecting step 150, thus preventing water from passing through the depressions 142 of the uneven seat 140.

As such, the hydraulic control valve of the present invention is constructed to feed a predetermined amount of water when the water pressure is low, and to prevent the flow of water when the water pressure rapidly increases, thus preventing the drip hose H/N from being damaged and preventing any waste of water, therefore being economical.

FIGS. 7 through 11 show a hydraulic control valve according to the second embodiment of the present invention. The hydraulic control valve according to the second embodiment is operated contrary to that of the first embodiment. That is, the control valve of the second embodiment is constructed to prevent the flow of water when water pressure is low, and to feed a predetermined amount of water when the water pressure is high.

A plurality of grooves 143 are longitudinally provided on an inner circumference of the smaller-diameter path 120b of the hose connector 110 to be connected to the depressions 142. In this case, each of the grooves 143 is longer than the U-shaped flexible cup 200. Further, the hydraulic control valve further includes a holder 310. The holder 310 is fitted into an end of the larger-diameter path 120a, and passes through an opening of the U-shaped flexible cup 200 to be in close contact with an inner surface of the U-shaped flexible cup 200. Another water supply path 320 is provided along a central axis of the holder 310.

The operation of the hydraulic control valve according to the second embodiment is as follows. That is, as shown in FIG. 12, water is fed from the branch hose H/S through the water supply path 320 of the holder 310 into the U-shaped flexible cup 200.

When fed water has a low pressure, the U-shaped flexible cup 200 is not expanded outward, thus preventing the flow of water.

Meanwhile, as shown in FIG. 13, when fed water has a high pressure, the U-shaped flexible cup 200 is expanded outward, and water flows backward through a gap between an outer surface of the holder 310 and the U-shaped flexible cup 200. Thus, the water flows along the depressions 142 of the uneven seat 140 and the grooves 143 which are longitudinally arranged to be aligned with the depressions 142.

The hydraulic control valve according to the second embodiment can be utilized at a space where the water supply is allowed only when water pressure is relatively high.

INDUSTRIAL APPLICABILITY

As described above, the present invention provides a hydraulic control valve for agricultural drip hoses, which controls a water pressure to keep the flow of water constant regardless of the water pressure, thus preventing the drip hose from being damaged by high-pressure water, reducing manufacturing costs thereof due to a simple structure, and enhancing reliability of a product due to minimized malfunction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A hydraulic control valve for drip hoses, comprising a hose connector clamped at opposite ends thereof to an end of a branch hose and an end of a drip hose, respectively, and having a water supply path in the hose connector, wherein the water supply path comprises:
   a larger-diameter path having a stepped seat, the stepped seat comprising:
   an uneven seat having a plurality of projections and depressions that are alternately arranged on an upper surface of the uneven seat; and
   a smaller-diameter path having at a predetermined position thereof an inward projecting step, and
   the hydraulic control valve further comprises:
   a U-shaped flexible cup opened at a first end thereof and placed at a second end thereof to be near to the inward projecting step, the U-shaped flexible cup comprising:
   a flange outwardly protruded from an edge of the U-shaped flexible cup, and stopped by the uneven seat so that the U-shaped flexible cup is fitted into the smaller-diameter path while an outer surface of the U-shaped flexible cup is spaced apart from the smaller-diameter path by a predetermined gap; and
   a support ring fitted into an end of the larger-diameter path to prevent the U-shaped flexible cup from being removed.

2. The hydraulic control valve according to claim 1, wherein the hose connector further comprises:
   a plurality of grooves longitudinally provided on an inner circumference of the smaller-diameter path to be connected to the depressions, each of the grooves being longer than the U-shaped flexible cup, and
   the hydraulic control valve further comprises:
   a holder fitted into the end of the larger-diameter path, and passing through an opening of the U-shaped flexible cup to be in close contact with an inner surface of the flexile cup, with another water supply path being provided along a central axis of the holder.

* * * * *